(12) United States Patent
Burton et al.

(10) Patent No.: US 7,794,201 B2
(45) Date of Patent: Sep. 14, 2010

(54) GAS TURBINE ENGINES INCLUDING LEAN STATOR VANES AND METHODS OF ASSEMBLING THE SAME

(75) Inventors: Scott Andrew Burton, Cincinnati, OH (US); Chander Prakash, Cincinnati, OH (US); Joseph Machnaim, Bangalore (IN); David Glenn Cherry, Loveland, OH (US); Robert John Beacock, Cincinnati, OH (US); Ching-Pang Lee, Cincinnati, OH (US); Craig Miller Kuhne, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 731 days.

(21) Appl. No.: 11/615,541

(22) Filed: Dec. 22, 2006

(65) Prior Publication Data

US 2008/0152504 A1   Jun. 26, 2008

(51) Int. Cl.
   *F01D 1/02* (2006.01)
(52) U.S. Cl. .................. 415/191; 415/199.2; 29/889.21; 29/889.22
(58) Field of Classification Search ............... 415/191, 415/199.5, 209.1, 211.2
   See application file for complete search history.

(56) References Cited

U.S. PATENT DOCUMENTS 3,745,629 A * 7/1973 Pask et al. ............... 29/889.22
4,365,477 A   12/1982 Pearce
4,688,988 A   8/1987 Olsen
4,826,397 A   5/1989 Shook et al.
5,482,433 A   1/1996 Norris et al.
5,513,955 A   5/1996 Barcza
6,287,075 B1 * 9/2001 Kercher .................. 416/97 R
6,331,100 B1 * 12/2001 Liu et al. .................. 416/238
6,554,569 B2   4/2003 Decker et al.
6,709,233 B2   3/2004 Haller
6,719,528 B2   4/2004 Kuno et al.
6,905,307 B2   6/2005 Kawarada et al.
7,121,792 B1 * 10/2006 Fessou et al. ............... 415/191
2008/0148564 A1 * 6/2008 Burton et al. ............. 29/888.02

OTHER PUBLICATIONS

European Patent Office, Search Report for Application No. 07123149.2, Apr. 9, 2010, 7 pages, EP.

* cited by examiner

*Primary Examiner*—Edward Look
*Assistant Examiner*—Ryan H Ellis
(74) *Attorney, Agent, or Firm*—William Scott Andes, Esq.; Armstrong Teasdale LLP

(57) ABSTRACT

A stator vane that may be used in an engine assembly is provided. The stator vane includes an airfoil that has a first sidewall and a second sidewall, which connects to the first sidewall at a leading edge and at a trailing edge. The airfoil also includes a root portion and a tip portion. The first and second sidewalls both extend from the root portion to the tip portion. The airfoil root portion is formed with a negative lean, and the airfoil tip portion is formed with a positive lean.

17 Claims, 6 Drawing Sheets

US 7,794,201 B2

1

GAS TURBINE ENGINES INCLUDING LEAN STATOR VANES AND METHODS OF ASSEMBLING THE SAME

BACKGROUND OF THE INVENTION

This invention relates generally to gas turbine engines, and more specifically to turbine nozzle assemblies in gas turbine engines.

In at least some known gas turbine engines, combustion gases flow through a high-pressure turbine and a low-pressure turbine to generate torque, which powers the upstream compressor and fan. In at least some known low-pressure turbine assemblies, the low-pressure turbine is rotatably coupled to a front fan assembly. Stator vanes in the low-pressure turbine channel combustion gases downstream towards a row of rotating turbine blades. The gas flow induces rotation to the turbine blades which causes rotation of the front fan assembly.

The flowfield of the combustion gases that travel through the turbines can be complex. For example, portions of the outer surfaces of the vanes, blades, and/or other components of the turbine assembly may induce secondary flows in the combustion gases that are perpendicular to the direction of the core flow. Such secondary flows can cause an undesirable loss in pressure and a reduction in engine efficiency. Optimizing the surroundings of the flowfield may facilitate reducing pressure losses and improving engine efficiency.

BRIEF DESCRIPTION OF THE INVENTION

In one aspect, a method for assembling a gas turbine engine is provided. The method includes coupling at least one stator assembly that has at least one stator vane extending from an inner band within the gas turbine engine. The stator vane includes a root portion that extends from the inner band and is formed with a negative lean. The stator vane also includes a radially outer tip portion that is formed with a positive lean. The method further includes coupling at least one turbine blade assembly downstream from the stator assembly, wherein the turbine blade assembly has at least one rotor blade.

In another aspect, a turbine nozzle assembly is provided. The turbine nozzle assembly includes a radially inner band and at least one stator vane that extends radially outward from the inner band. The stator vane includes an airfoil having a root portion and a tip portion. The root portion extends from the inner band with a negative lean, and the tip portion is formed with a positive lean.

In another aspect, a stator vane is provided. The stator vane includes an airfoil that has a first sidewall and a second sidewall, which connects to the first sidewall at a leading edge and at a trailing edge. The airfoil also includes a root portion and a tip portion. The first and second sidewalls both extend from the root portion to the tip portion. The airfoil root portion is formed with a negative lean, and the airfoil tip portion is formed with a positive lean.

DETAILED DESCRIPTION OF THE INVENTION

The present invention provides a method and components that facilitate reducing secondary flows in gas turbine engines, such that engine efficiency is facilitated to be increased. Although embodiments discussed herein include stator vanes, turbine assemblies, gas turbine engines, and methods of manufacturing the same, those having ordinary skill in the art will appreciate that the present invention is not limited to use with gas turbine engines or any of the exemplary embodiments described or illustrated herein.

Figure 1:
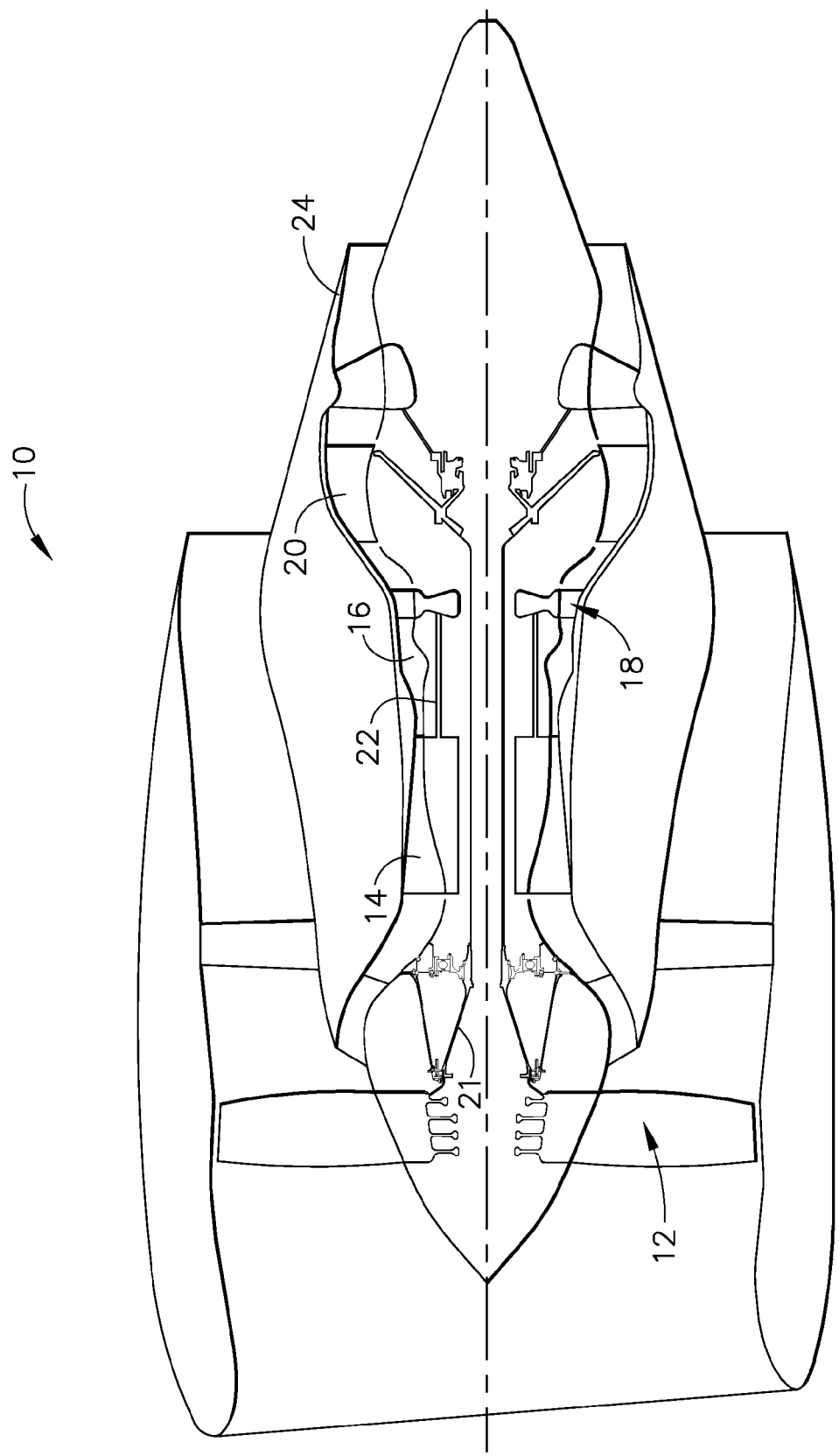
FIG. 1 is a schematic illustration of an exemplary gas turbine engine.

FIG. 1 is a schematic illustration of an exemplary gas turbine engine 10 including a fan assembly 12, a high-pressure compressor 14, and a combustor 16. Engine 10 also includes a high-pressure turbine 18 and a low-pressure turbine 20. Fan assembly 12 and low-pressure turbine 20 are coupled by a first shaft 21, and compressor 14 and high-pressure turbine 18 are coupled by a second shaft 22. In one embodiment, gas turbine engine 10 is a GE90 engine commercially available from General Electric Aircraft Engines, Cincinnati, Ohio.

During operation, air flows through fan assembly 12 supplying compressed air to high-pressure compressor 14. The highly compressed air is delivered to combustor 16. Airflow from combustor 16 is channeled through one or more turbine nozzle assemblies (not shown in FIG. 1) to drive turbines 18 and 20, prior to exiting gas turbine engine 10 through an exhaust nozzle 24. More specifically, pressurized air from high-pressure compressor 14 is mixed with fuel in combustor 16 and ignited, thereby generating combustion gases. The combustion gases induce rotation of high-pressure turbine 18 which causes rotation of high-pressure compressor 14. The combustion gases are discharged from high-pressure turbine 18 into low-pressure turbine 20. The core airflow is discharged from low-pressure turbine 20 and directed aftward towards exhaust nozzle 24.

Figure 2:
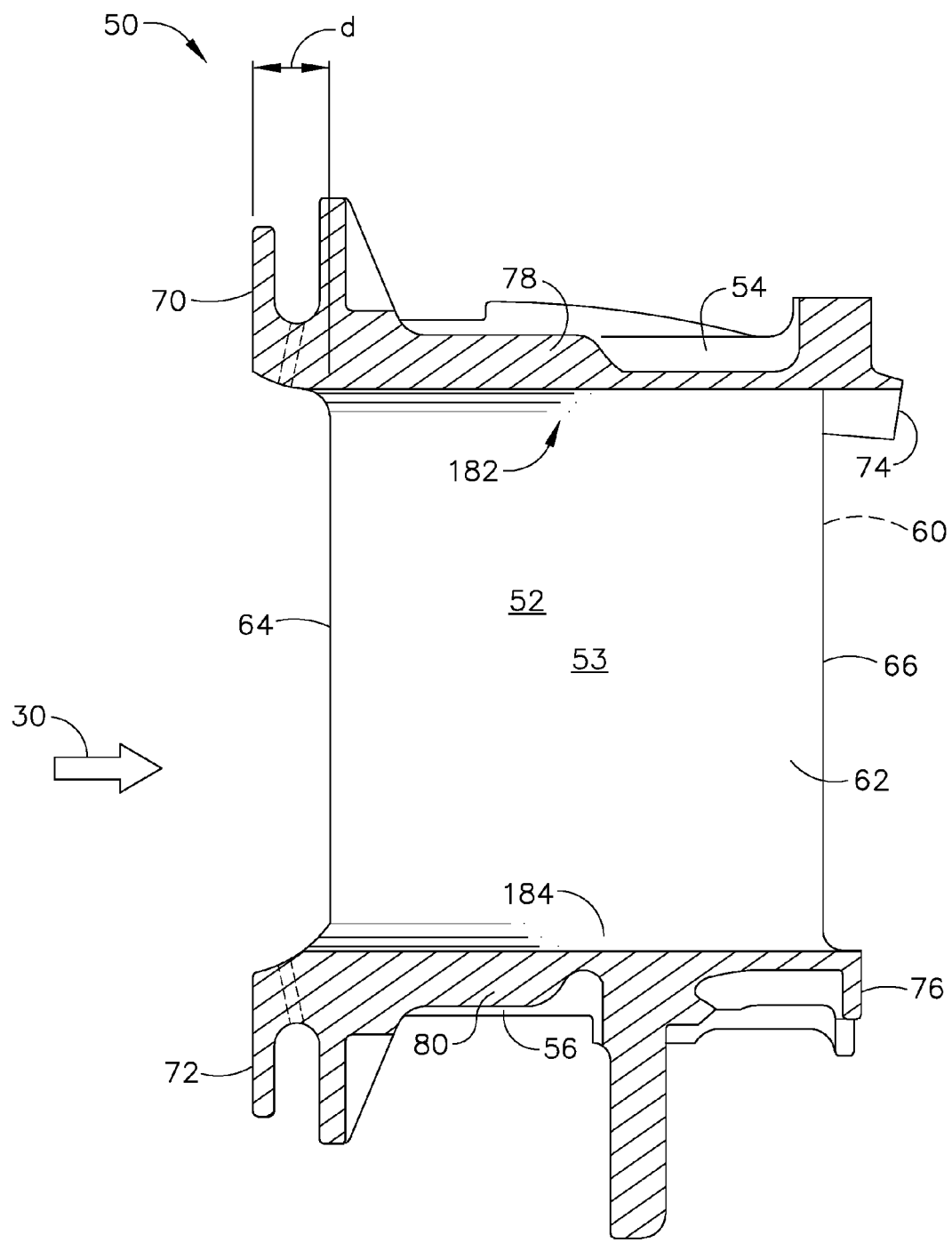
FIG. 2 is a side view an exemplary known turbine nozzle assembly that may be used in the gas turbine engine shown in FIG. 1.

FIG. 2 is a side view of an exemplary turbine nozzle assembly 50 with a stator vane 52 that may be used with a turbine engine, such as but not limited to gas turbine engine 10 (shown in FIG. 1). Although the present invention is described with reference to turbine nozzle assembly 50, those having ordinary skill in the art will appreciate that the present invention is not limited to use with turbine nozzle assembly 50 but may be used with other assemblies, such as a stator assembly. Stator vane 52 has an airfoil 53 formed by a pressure-side sidewall 60 and a suction-side sidewall 62 that are joined together at a leading edge 64 and at a chordwise-spaced trailing edge 66 such that a cooling cavity 68 (shown in FIG. 3) is defined between sidewalls 60 and 62. Airfoil sidewalls 60 and 62 each extend radially between an outer band 54 and an inner band 56. In the exemplary embodiment, sidewall 60 is concave, and sidewall 62 is convex such that stator vane 52 has a cambered profile. Furthermore, airfoil 53 includes a tip portion 182 and a root portion 184.

Outer band 54 includes a leading edge surface 70, a trailing edge surface 74, and a body 78 extending therebetween. Inner band 56 includes a leading edge surface 72, a trailing edge surface 76, and a body 80 extending therebetween. In the exemplary embodiment, stator vane 52 is oriented such that outer and inner band leading edge surfaces 70 and 72, respectively, are each a distance d upstream from stator vane leading edge 64.

Figure 3:
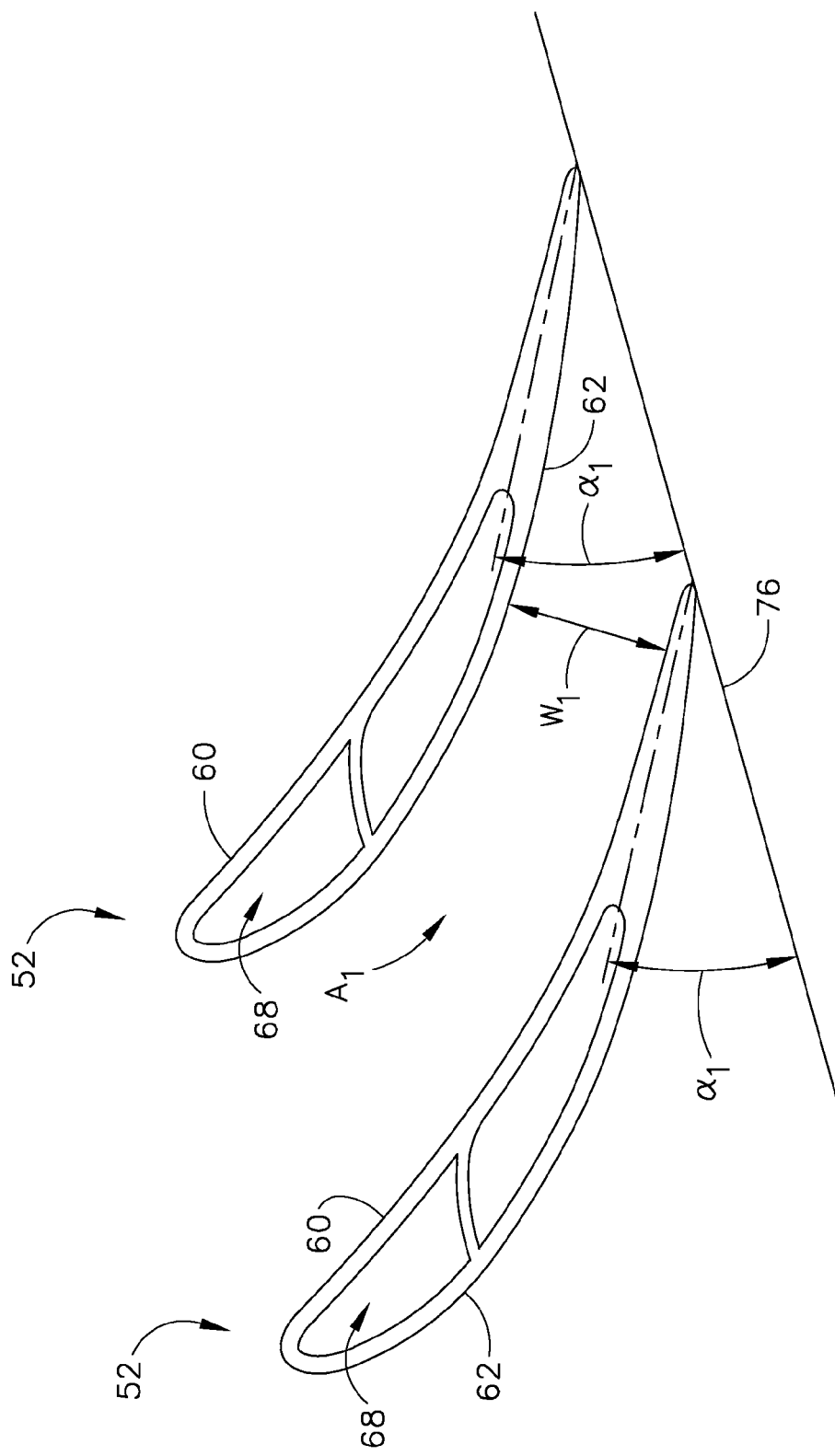
FIG. 3 is a cross-sectional view of two known stator vanes that may be used with the nozzle assembly shown in FIG. 2.

FIG. 3 is a bottom cross-sectional view of a pair of adjacent stator vanes 52 that may be used with turbine nozzle assembly 50. Stator vanes 52 are each oriented at an angle $\alpha_1$ with respect to trailing edge 76 on inner band 56 such that a throat area $A_1$ is defined between vanes 52. By adjusting angle $\alpha_1$, a width $W_1$ of throat area $A_1$ can be increased or decreased. More specifically, increasing throat area $A_1$ facilitates increasing a mass flow of air channeled between stator vanes 52, and decreasing throat area $A_1$ facilitates decreasing the mass flow of air channeled between stator vanes 52.

Figure 4:
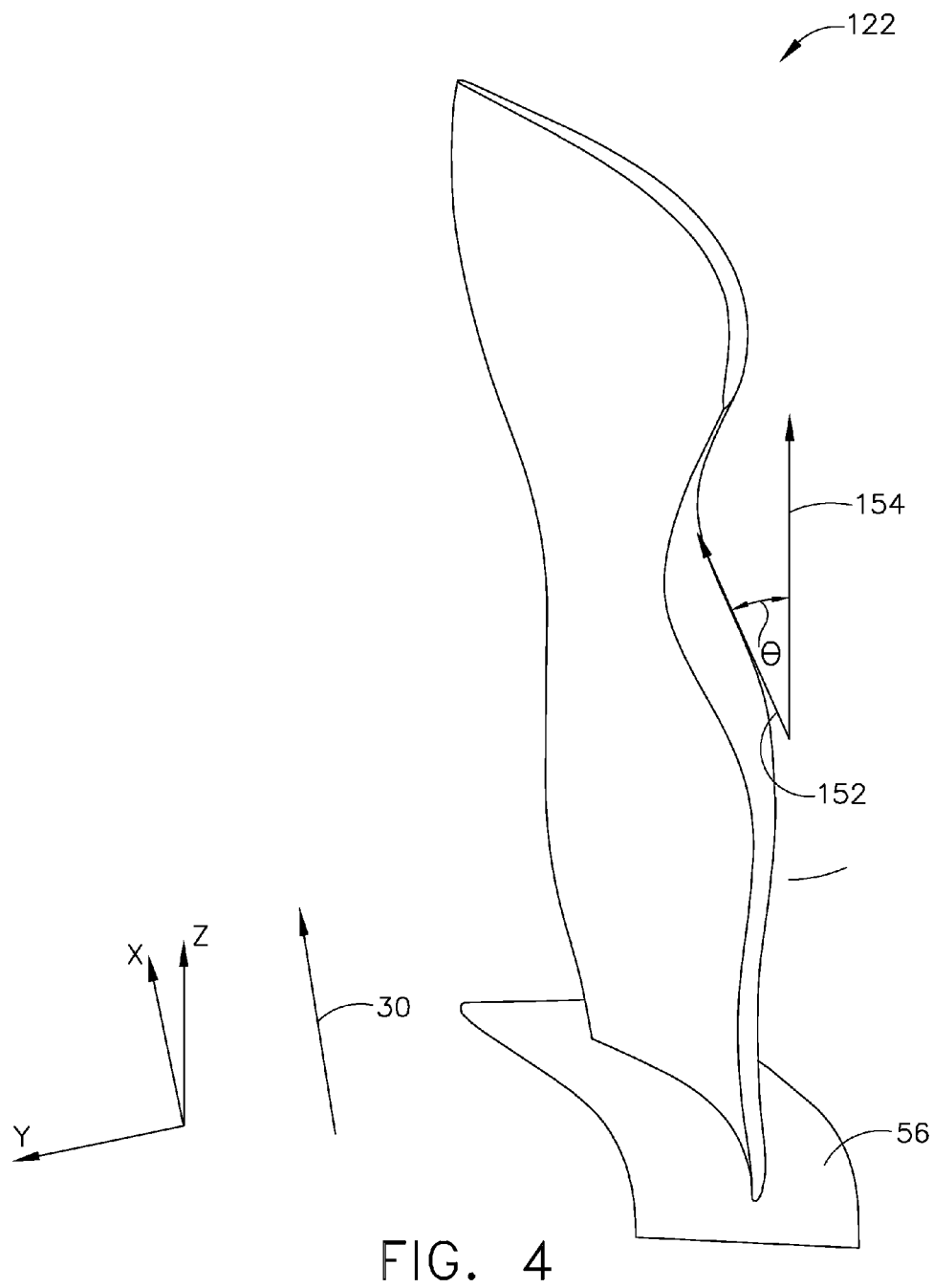
FIG. 4 illustrates an exemplary multi-lean vane that may be used with the nozzle assembly shown in FIG. 2.
Figure 5:
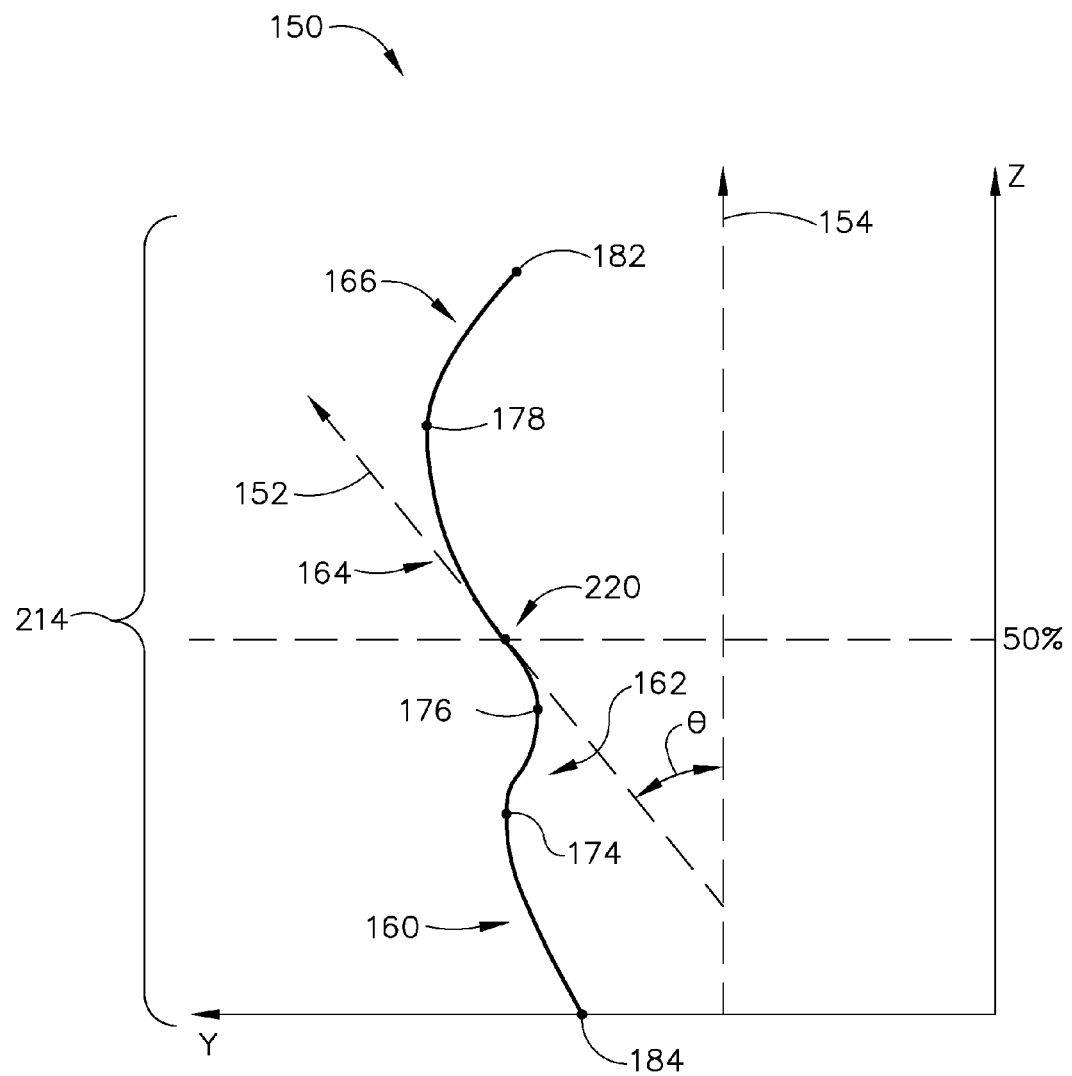
FIG. 5 illustrates a centerline cross-section of the multi-lean vane shown in FIG. 4.

FIGS. 4 and 5 illustrate an exemplary multi-lean vane 122 that may be used with turbine nozzle assembly 50. More specifically, FIG. 4 is a perspective view of multi-lean vane 122 and includes three exemplary orthogonal axes including an axial axis (X-axis), a tangential or circumferential axis (Y-axis), and a radial axis (Z-axis). FIG. 5 illustrates a cross-section through centerline 150 along the Y-Z plane. Centerline 150 extends from root portion 184 to tip portion 182. In the exemplary embodiment, the X-axis extends downstream relative to flowpath 30, the Z-axis extends radially outwardly from inner band 56 (shown in FIG. 2), and the Y-axis extends in the circumferential direction.

As used herein, the term "lean" is defined as a radial angle Θ defined between a surface tangent 152 to multi-lean vane 122 and a line 154 extending substantially parallel to the Z-axis. In some embodiments, the amount of lean of vane 122 is referred to as "tilt." If a portion of stator vane 122 has a negative radial angle Θ with respect to line 154 (as shown in FIG. 5), then that portion of multi-lean vane 122 has a forward lean. If a portion of stator vane 122 has a positive radial angle Θ with respect to line 154, then that portion of multi-lean vane 122 has a backward lean. Described in more detail below, multi-lean vane 122 includes an airfoil 123 having a plurality of lean portions. As used herein, the term "lean portion" refers to a radially-extending portion of multi-lean vane 122 that is defined between one lean directional change and another lean directional change, or one lean directional change and tip portion 182 or root portion 184. As used herein, the term "lean directional change" refers to points of airfoil 123 in which the direction of lean changes from a forward lean to a backward lean, or vice-versa.

Figure 6:
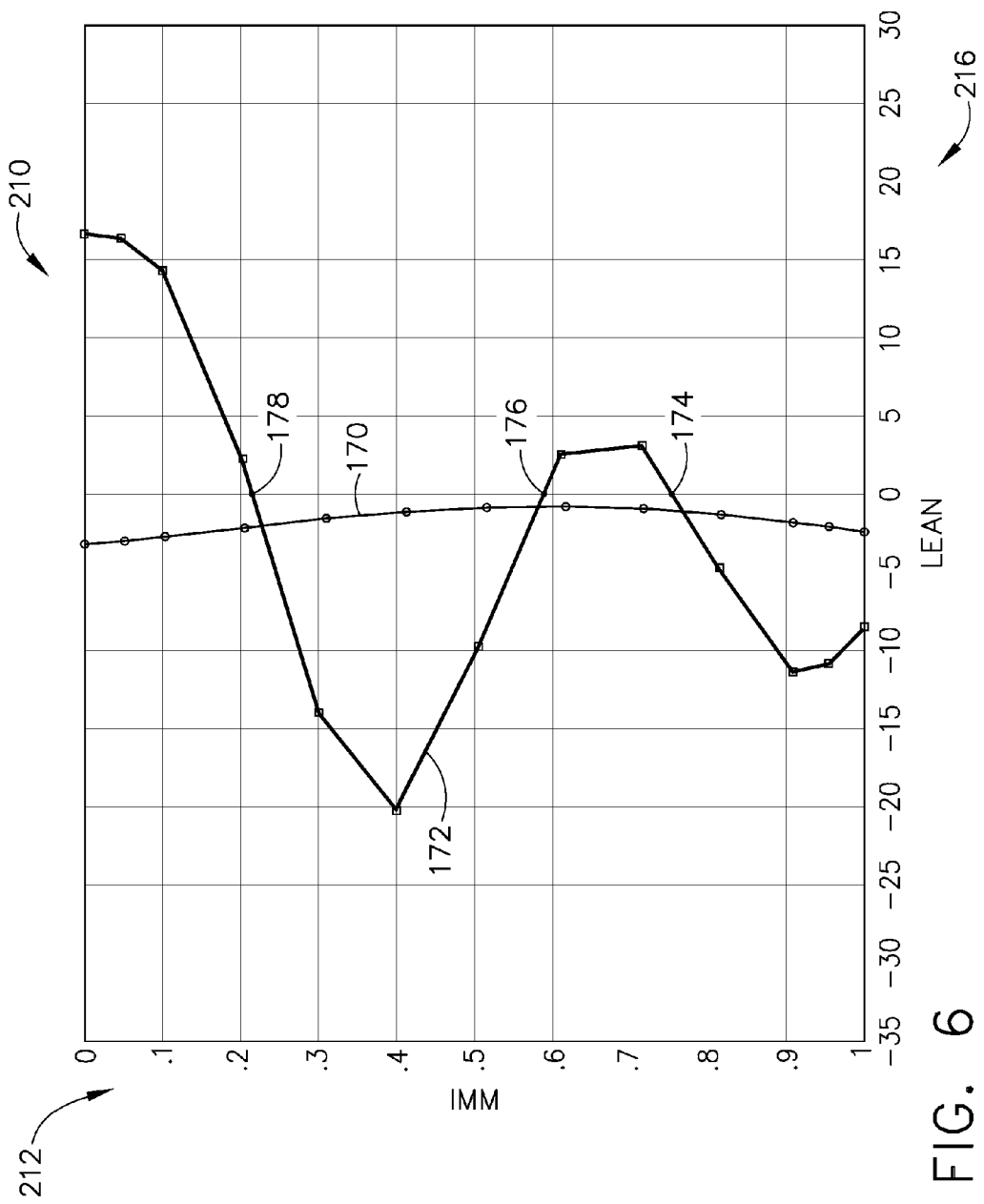
FIG. 6 is a graph illustrating exemplary lean angle values of the multi-lean vane shown in FIG. 4.

FIG. 6 is a graph 210 illustrating exemplary lean angle values 172 corresponding to leading edge 64 of multi-lean vane 122. More specifically, exemplary lean angle values 172 of edge 64 are plotted graphically wherein the ordinate 212 of graph 210 represents a percent of span of airfoil 123 extending from root portion 184 to tip portion 182, i.e., the distance from tip portion 182 divided by the total vane height 214 (shown in FIG. 5), and abscissa 216 of graph 210 represents an amount of lean angle Θ for edge 64 of airfoil 123. For illustrative purposes, a solid line 170 represents an amount of lean associated with a conventional stator vane. Accordingly, at root portion 184, represented as an immersion point of 1.0, lean angle value 172 of edge 64 is approximately equal to −8°. Airfoil 123 of vane 122 leans forward from root portion 184 to an immersion point of approximately 0.75, wherein the lean changes from a negative lean angle to a positive lean angle at a first lean directional change 174. This location 174 reflects a forward-to-backward lean change of vane 122. Airfoil 123 leans backward from location 174 to an immersion point of approximately 0.58, wherein a second lean directional change 176 occurs. This location 176 reflects a backward-to-forward lean change of vane 122. Airfoil 123 leans forward from location 176 to an immersion point of approximately 0.22, wherein a third lean directional change 178 occurs. This location 178 reflects a forward-to-backward lean change of vane 122. Accordingly, as shown in FIG. 6, multi-lean vane 122 includes three lean directional changes, 174, 176, and 178.

In the exemplary embodiment, multi-lean vane 122 includes a first lean portion 160, a second lean portion 162, a third lean portion 164, and a fourth lean portion 166 (shown in FIG. 5). First lean portion 160 is defined between root portion 184 and point 174 on the airfoil of vane 122. Second lean portion 162 is defined between point 174 and point 176. Third lean portion 164 is defined between point 176 and point 178. Fourth lean portion 166 is defined between point 178 and tip portion 182. Accordingly, in the exemplary embodiment, vane 122 has two lean portions 160 and 162 that occur before a midpoint 220. Third lean portion 164 begins below midpoint 220 and extends nearly 40% of vane 122 (seen in FIG. 6). Vane 122 has a reverse S-shape below midpoint 220, and a C-shape above midpoint 220.

The multiple lean profile of vane 122 facilitates reducing the secondary flow characteristics and reducing the strength of the secondary flow, thereby increasing engine efficiency. A conventional vane includes significantly more laminar separation bubbles at the trailing edge as compared to multi-lean vane 122. Moreover, the increased pressure at vane trailing edge 66 facilitates increasing turbine efficiency.

In one embodiment, a method for assembling a gas turbine engine is provided. The method includes coupling at least one stator assembly that has at least one stator vane extending from an inner band within the gas turbine engine. The stator vane includes a root portion that extends from the inner band and is formed with a negative lean. The stator vane also includes a radially outer tip portion that is formed with a positive lean. The method further includes coupling at least one turbine blade assembly downstream from the stator assembly, wherein the turbine blade assembly has at least one rotor blade.

Described herein is a stator vane that may be utilized in a wide variety of engine assemblies. In each embodiment and the described method, the stator vane has an airfoil with a variable lean, which facilitates weakening secondary airflows that may reduce the pressure in the turbine assembly and that can cause inefficiencies in the engine. As a result, the total pressure of the combustion gases exiting the turbine assembly may be increased and, consequently, the turbine efficiency may increase. Accordingly, turbine engine performance may be enhanced in a cost-effective and reliable manner with the stator vanes described herein.

Exemplary embodiments of a stator vane and turbine nozzle assembly for a gas turbine engine are described above in detail. The stator vane and turbine nozzle assembly illustrated are not limited to the specific embodiments described herein, but rather, components of each stator vane and each turbine nozzle assembly may be utilized independently and separately from other components described herein.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
coupling a stator assembly within the gas turbine engine, the stator assembly including a stator vane that includes an airfoil that extends from a root to a tip such that a midpoint is defined between the root and the tip, the stator vane having a greater negative lean above the midpoint than below the midpoint and a plurality of lean directional changes defined between the root and the midpoint; and coupling at least one turbine blade assembly including at least one rotor blade downstream from the stator assembly.

2. A method in accordance with claim 1 wherein coupling a stator assembly within the gas turbine engine further comprises providing the stator vane with a plurality of lean directional changes defined between the root and the tip.

3. A method in accordance with claim 1 wherein coupling a stator assembly within the gas turbine engine further comprises providing the stator vane with a plurality of lean directional changes defined between the root and the tip including one lean directional change defined between the midpoint and the tip.

4. A method in accordance with claim 1 wherein coupling a stator assembly within the gas turbine engine further comprises providing the stator vane with at least three lean directional changes defined between the root and the tip.

5. A method in accordance with claim 1 wherein Coupling a stator assembly within the gas turbine engine further comprises providing the stator vane with a plurality of lean directional changes configured to reduce secondary airflows in the gas turbine engine.

6. A turbine nozzle assembly comprising:
a radially inner band; and
a stator vane extending radially outward from said radially inner band, wherein said stator vane comprises an airfoil comprising a root and a tip such that a midpoint is defined between said root and said tip, said stator vane comprising a greater negative lean above the midpoint than below the midpoint and a plurality of lean directional changes defined between said root and the midpoint.

7. A turbine nozzle assembly in accordance with claim 6 wherein said stator vane further comprises a plurality of lean directional changes defined between said root and said tip.

8. A turbine nozzle assembly in accordance with claim 6 wherein said stator vane further comprises a plurality of lean directions defined between the midpoint and said tip.

9. A turbine nozzle assembly in accordance with claim 6 wherein said stator vane further comprises at least three lean directional changes defined between said root and said tip.

10. A turbine nozzle assembly in accordance with claim 6 wherein said stator vane facilitates reducing laminar separation of air flowing through said turbine nozzle assembly.

11. A turbine nozzle assembly in accordance with claim 6 wherein said stator vane further comprises at least three lean directional changes defined between said root and said tip, wherein said lean directional changes are configured to reduce secondary airflows.

12. A stator vane comprising:
an airfoil comprising:
a first sidewall; and
a second sidewall connected to said first sidewall at a leading edge and at a trailing edge, said airfoil further comprising a root and a tip, each of said first and second sidewalls extending from said root to said tip such that a midpoint is defined between said root and said tip, said stator vane comprising a greater negative lean above the midpoint than below the midpoint and a plurality of lean directional changes defined between said root-and-the midpoint.

13. A stator vane in accordance with claim 12 wherein said stator vane further comprises a plurality of lean directional changes defined between said root and said tip.

14. A stator vane in accordance with claim 12 wherein said stator vane further comprises one lean directional change defined between the midpoint and said tip.

15. A stator vane in accordance with claim 12 wherein said stator vane further comprises at least three lean directional changes defined between said root and said tip.

16. A stator vane in accordance with claim 12 wherein said stator vane further comprises a plurality of lean directional changes defined between said root and said tip, said plurality of lean directional changes configured to reduce secondary airflows.

17. A stator vane in accordance with claim 12 wherein said stator vane facilitates reducing laminar separation of air flowing through said turbine nozzle assembly.

* * * * *